Figure 1:
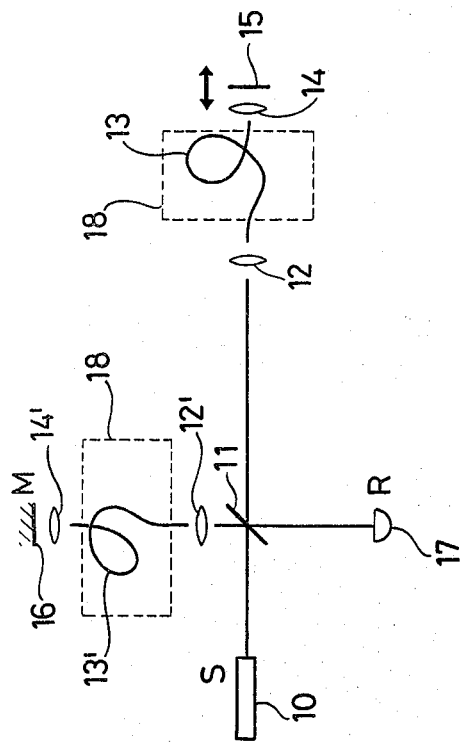

United States Patent [19]

Martinelli

[11] 4,420,260
[45] Dec. 13, 1983

[54] INTERFEROMETER TRANSMITTING THE USEFUL PHASE INFORMATION THROUGH OPTICAL FIBRES

[75] Inventor: Mario Martinelli, Suzzara, Italy

[73] Assignee: Cise - Centro Informazioni Studi Esperienze S.p.A., Milan, Italy

[21] Appl. No.: 374,896

[22] Filed: May 4, 1982

[30] Foreign Application Priority Data

May 6, 1981 [IT] Italy .................. 21529 A/81

[51] Int. Cl.³ ............................................ G01B 9/02
[52] U.S. Cl. .......................... 356/351; 73/657; 356/358
[58] Field of Search ........... 356/345, 349, 351, 357, 356/358, 360; 73/655, 657

[56] References Cited

U.S. PATENT DOCUMENTS 4,153,370  5/1979  Corey .................. 356/358

FOREIGN PATENT DOCUMENTS 1373645  11/1974  United Kingdom ........... 356/358

OTHER PUBLICATIONS

Hemsing, "Velocity Sensing Interferometer (VISAR) Modification", *Rev. Sci. Instrum.*, vol. 50, No. 1, pp. 73–78, Jan. 1979.

*Primary Examiner*—William L. Sikes
*Assistant Examiner*—Matthew W. Koren
*Attorney, Agent, or Firm*—Cushman, Darby & Cushman

[57] ABSTRACT

The invention relates to an inerferometer based on the exploitation of an optical fibre through which both the phase signal which is of interest for the measurements concerned and a reference signal are simultaneously forwarded in order that in the differential measurement the noise introduced by the optical fibre for both thermal and mechanical reasons is ruled out.

13 Claims, 6 Drawing Figures

INTERFEROMETER TRANSMITTING THE USEFUL PHASE INFORMATION THROUGH OPTICAL FIBRES

Optical and electronic techniques which exploit laser sources have recently found a widespread use in the measurements of vibrations (amplitude, phase). In lasers, the properties of coherence both in time and space are exploited and these permit that instruments may be obtained which have a great versatility of use and a high sensitivity (fractions of a micron in the measurement of the vibration amplitude). The instruments provided heretofore have as their principal imposed condition for working the necessity of a direct optical access (in straight or segmented line, the segmentation being of a simple pattern) to the point in which it is desired that the vibration be measured. This limitation in use has prodded a search activity directed to examining the feasibility of employing an optical fibre as a "channel" for propagating the laser light beams.

An optical fibre intended as a sensor exhibits intrinsic properties which have a great significance, such as, for instance, the insensitivity of electromagnetic radiations and the great resistance in environments in which the temperature is high.

These features are such as to invite to speculate as to the possibility of constructing an instrument for measuring the vibrations of rotating component parts of turboalternators (where intense electromagnetic fields are experienced) or in the interior of vessels and heat-exchangers (in the presence of liquids at a high temperature).

In such instruments the optical fibre is placed to replace a portion of the optical path of the measuring arm.

In this way at least as a principle, it should be possible to overcome the geometrical restrictions as to the optical path in the conventional interferometers. In actual practice, however, the optical fibre behaves like a detector which is extremely sensitive to the environmental noise. Any disturbance which modifies the refractive index or the length of the optical fibre, in fact, originates a variation in the phase of the transferred light signal. The disturbance may be originated by a number of causes, such as a localized variation of pressure or temperature, and these situations are extremely likely to occur in industrial installations (for example in the interior of machines or on large structural units). Such variations are summed randomly to the variation of the useful phase, so that the signal-to-noise ratio of the entire system is worsened until rendering the operation impossible even when short optical fibre shanks are used.

The most serious problem to be solved is that posed by the environmental noise, which, by exciting the fibre in an undesirable and uncontrollable way the fibre, considerably lowers the ratio of the useful interferential signal to the noise.

The effect of an environmental noise is to originate a phase variation in the light signal flowing through the fibre.

An objective of the invention is to provide a measurement instrument of the kind referred to above with the transmission of the beam through an optical fibre, in which the intense degradation of the useful signal, as originated by the keen sensitivity of the optical fibre to the environmental noise, is prevented without requiring a thermal and acoustical insulation of the fibre having such dimensions as to become a serious limitation to the practical use of the device concerned.

According to the invention, consequently, an interferometer is provided, which comprises a laser-light emitter which sends a polarized light beam to the input end of a single-mode optical fibre, at the output end whereof a first beam splitter is provided which directs the two resultant beams onto a reference mirror and onto a device producing a reflection of the beam with a modulation of the optical phase which must be detected, respectively, the two beams reflected by the device and by the reference mirror, respectively, being fed back through said first splitter to said output end of the optical fibre to form a composite beam to be sent from said optical fibre input and to a detecting element.

In order that the objectives and the features which are essential for this invention may be made quite clear, it will be described hereinafter how the invention can find a practical application, reference being had to FIGS. 1 to 6 of the accompanying drawings which show general diagrams of interferometers which operate according to the principles of this invention.

FIG. 1 shows a diagram illustrating a first embodiment of an elementary interferometer made according to the present invention.

An interferometer comprises a source 10, of coherent light which sends a beam towards a beam splitter 11. The laser-light beam flowing through the splitter 11 is sent through an input optical system 12 into a fibre 13 which, via the optical system 14, sends the beam to impinge on the target mirror 15.

The beam reflected by the splitter 11 flows through an input optical system 12', a fibre 13' and an optical system 14' to strike a mirror 16.

The beam reflected by 16 and flowing through the splitter 11 is summed to the beam reflected by the mirror 15 and reflected again by the splitter 11, to reach the photodetector 17.

Such an arrangement of parts could be embodied to achieve the objects of the invention by placing the two optical fibres in a close mechanical connection, so as to have both these fibres undergoing the same thermal and mechanical stresses which are the source of noise in an environment 18. Thus, the noise induced in the branch 13' of reference which is linked to the mirror 16 is the same noise which is induced in the fibre branch 13, so that, on the detector 17, one could have, in theory, a signal stripped of the noise by differential substraction and which, consequently, is only a function of the vibratory motion of the mirror 15.

The diagram of FIG. 1 has been reported herein only to explain the principles on which the invention is based, but is, apparently, difficult to embody in practice, on taking also into account the problems inherent in subjecting the two branches 13 and 13' to the same cause of trouble which produces an equal noise.

Figure 2:
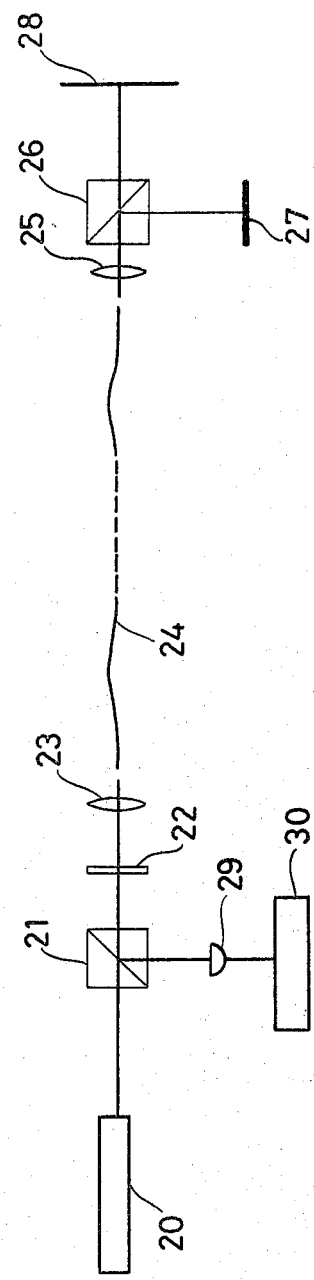

Thus, the interferometer according to the invention may become practically embodied by the arrangement shown in FIG. 2.

In this example, the purpose of the measurement is to detect the vibration amplitude of a target mirror, and, in this embodiment, a laser source 20 sends a beam of vertically polarized light to the polarizing beam splitter indicated at 21. A quarter-wave lamina, indicated at 22, circularly polarizes the light which, via the input optical system 23, is sent into the fibre 24. At the output of the fibre the light, collected through the optical system 25, is partly reflected by the beam splitter 26 and partly reflected by the reference mirror 27.

Conversely, the light flowing through the splitter 26 is sent to the target mirror 28 which is vibratory and reflects such light to feed it back via the splitter 26 along the optical fibre, along which also the return beam is fed, which has been reflected by the mirror 27 and reflected by the splitter 26 again.

The combined return beams emerge out of the fibre through the optical system 23 and flow again through the quarter-wave lamina 22 so that they reach the polarizing beam splitter 21 with a horizontal polarization and, therefrom, they are fed to the photodetector 29.

There can be provided, according to the conventional art, an analyzer 30 for the signal from the photodetector.

The photodetector 29 thus receives a sensing beam, reflected by the vibratory mirror 28, and a reference beam reflected by the mirror 27, which have flown through the same fibre 24 and thus have undergone the same disturbances which originate the noise that is superposed to the signal consisting of the useful phase variation deriving from the vibrations of the mirror 28 which are actually to be detected.

Thus the useful signal is obtained by differential substraction of the noise collected by the transmission line with optical fibres, so that it becomes possible to do away with the shortcomings which are inherent in a too low signal-to-noise ratio, such as would be obtained by adopting the optical fibre transmission in the conventional Michelson interferometer pattern, in which only the useful phase information is transferred through an optical fibre.

It should not be overlooked, however, that the configuration of the interferometer as described above does not solve in a complete way the problem of achieving a satisfactorily high signal-to-noise ratio. As a matter of fact, the characteristics of the optical fibre to be used should be carefully scrutinized.

In the usual optical fibres (such as those used in telecommunications) the propagation of the signal is multimodal, this term being intended to indicate a propagation which takes place with a very great number of wave carriers, which correspond to as many possible solutions of the electromagnetic field equation in the interior of the "cavity" composed of the fibre core and its coating.

The phase shift induced by the noise onto the signal involves all the modes, through the different degrees.

The recombination of the phase shifts as a condition for suppressing the environmental noise thus becomes statistically very unlikely to occur, in that it would require:

(a) the mode-mode recombination of the measuring and reference signal;
(b) the non-interference of the individual modes during the travel internally of the fibre. To solve this aspect of the problem it becomes thus necessary to adopt, for the interferometer, a kind of fibre which retains as far as practicable also the properties of spatial coherence of the laser light. The fibre which is suitable is, more particularly, the one which is called single-mode and is characterized in that it has a core which is very small (5–10 microns) relative to the usual fibres (100–500 microns). For such a fibre, in fact, with particular values of $\lambda$ and of input angles for the signal, it is possible to obtain a propagation on a single mode, so that the requirements for ruling out the noise are fully valid: a single-mode propagation fulfils both the requirement of recombination mode-mode of the reference and measurement signals because a single mode can be propagated through the fibre, and the requirement of non-interference of the individual modes during the travel of the light through the fibre.

Thus, a single-mode fibre is intended to be, herein, a fibre for which the fibre parameter V fulfils the relationship:

$$V = \frac{2\pi a}{\lambda} \cdot (n_1^2 - n_2^2)^{\frac{1}{2}} \text{ less than } 2.405$$

wherein:
$\lambda$ = wavelength of the used light in vacuum
$n_1$ = refractive index of the optical fibre core
$n_2$ = refractive index of the optical fibre cladding, and
$a$ = radius of the optical fibre core.

By adopting a single-mode fibre, an interferometer made according to the pattern shown in FIG. 2 has proven to possess a capability of detection with so high signal-to-noise ratios as to give the detector an indication which is fully comparable with that which would be obtained with a conventional Michelson interferometer, that is, an interferometer having a direct optical path which does not use any optical fibre to transmit the beam.

Such a result can be obtained even under fibre-stressing condition such as to generate a noise having such a magnitude as to render the useful signal of phase variation unrecognizable unless the differential compensation aimed at by this invention takes place.

To simplify the disclosure, the example shown had the form of a simple vibratory mirror for the reflecting target which originates in the light beam the phase modulation intended to be detected.

It is apparent, however, that the sensing beam exiting the splitter 26 can be focussed by an additional optical system to be forwarded to a remote vibratory target having a different degree of reflective power.

As a rule, the reflecting element for the sensing beam can be any known device capable of causing a phase modulation of the reflected beam as a function of a magnitude to be measured.

Likewise, the components of the pattern shown herein can be changed, even though they fulfill the same or equivalent functions, and can be supplemented by additional components known per se in order to achieve the objectives indicated for the invention herein: thus, there have not been described herein because they are conventional, the devices associated to the detector for measuring and analyzing the interferential phenomena.

More particularly, it should be noted that the optical diagram suggested in FIG. 2 relates to a configuration in which the reference beam and the measuring beam have the same frequency. This configuration can be dubbed "homodyne" to distinguish it from another pattern, the "heterodyne", in which it is possible to carry out a modulation as to frequency (or phase) of the reference beam. The latter configuration affords the advantage that detection is permitted, without undetermination, of target vibrations having an amplitude greater than the wavelength of the employed laser light.

The heterodyne configuration retains the same principle of noise rejection inherent in the optical fibre shown in FIG. 2.

In order to be able to modulate a reference beam while maintaining the measurement beam unaffected, two beams are fed to the fibre, which have mutually orthogonal polarization. The beam splitter indicated at 26 in FIG. 2 is replaced by a polarized beam splitter. By so doing, the reference beam can be modulated either as to phase or as to frequency and can totally be reflected by the mirror 27 placed downstream of the polarized beam splitter and fed back to the fibre input. The measurement beam, in its turn, flows unaffected through the polarized beam splitter and is reflected by the target 28 to be fed back to the fibre input.

By so proceeding, there are otained at the fibre output, two beams with mutually orthogonal polarization, which are caused to interfere after having made their polarization compatible by means of a half-wavelength delay lamina. This pattern provides for a signal treatment electronics which is radicallly different from that of the pattern of FIG. 2 and is consistent with the type of frequency or phase modulation as required by the particular application.

The optical scheme suggested by FIG. 2, moreover, can be modified so as to make the differential operation possible also whenever there are variations in the state of polarization of the light as induced during the travel of the light through the optical fibre. When the optical single-mode fibre undergoes important deformations (radii of curvature in the order of a few centimeters), a rotation of the plane of the polarized light is observed through the fibre. This phenomenon is such as to originate, potentially, undesired variations of intensity in the pattern of FIG. 2, since the polarizing beam splitter 21 has transmission characteristics which are a function of the state of polarization of the light.

Figure 3:
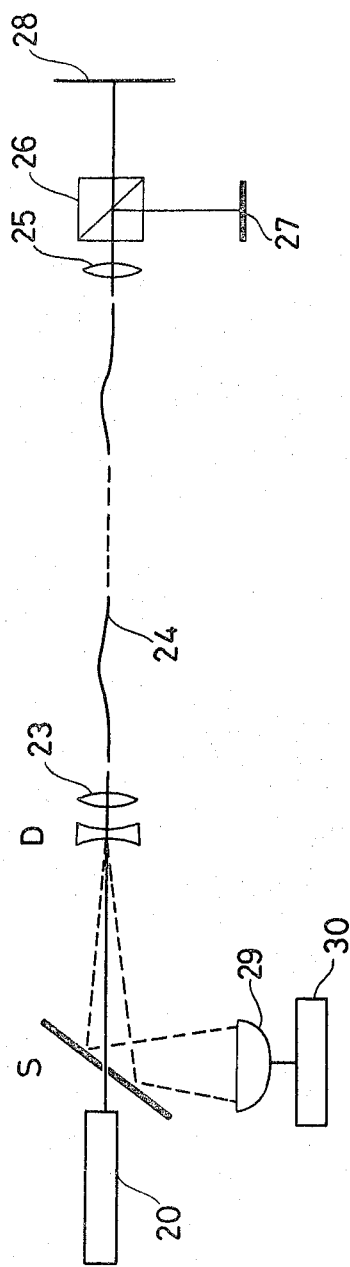
Figure 4:
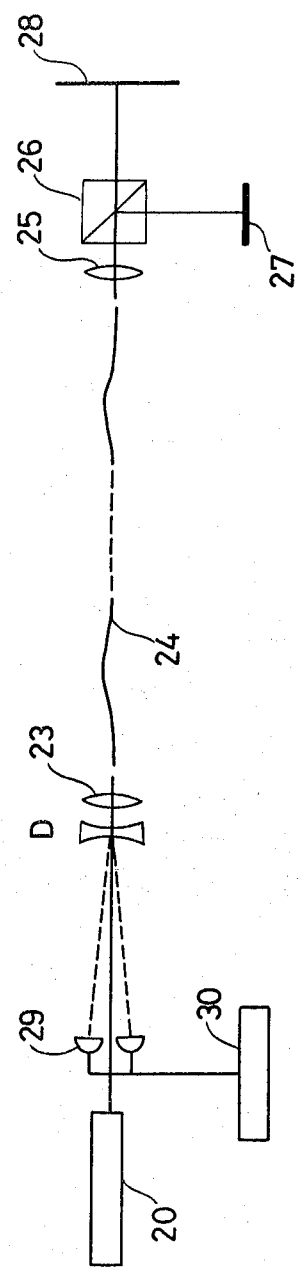
Figure 5:
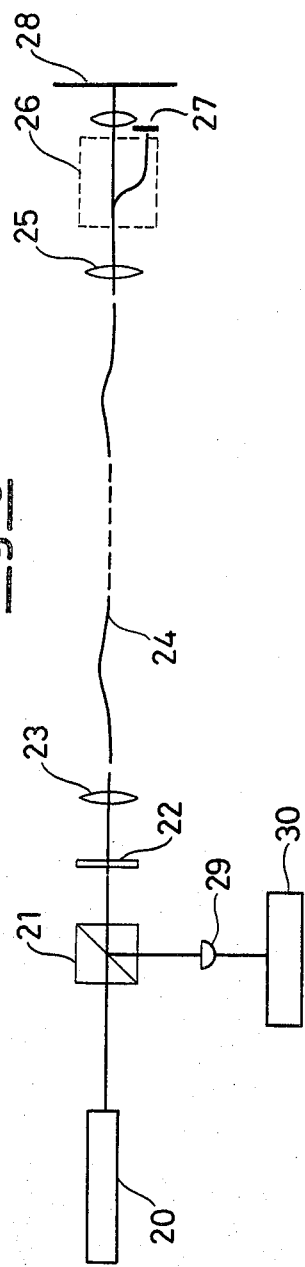
Figure 6:
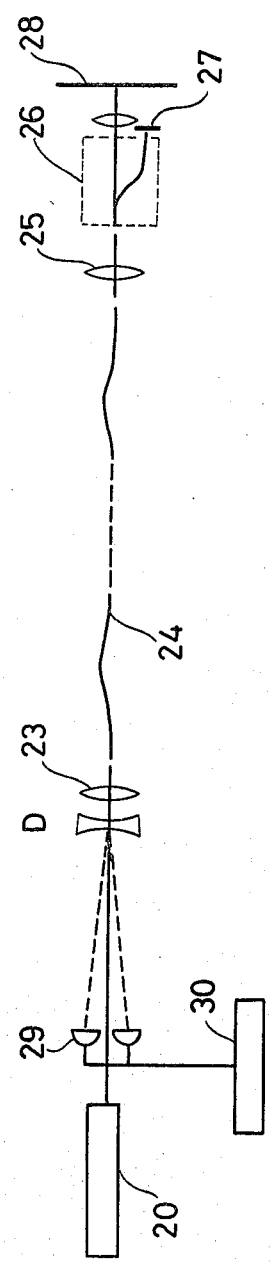

In order that such a drawback may be overcome, the mismatch between the laser source 20 and the light beam returning from the fibre can be embodied according to the suggestions contained in FIGS. 3 and 4. A diverging optical element D permits that the beam coming from the fibre may be diverged in such a way that only a small fraction of the power is fed back to the source 20. The major fraction of the beam:

(a) is collected by an appropriate perforated mirror S and sent to the photodetector 29 (FIG. 3), (b) is collected directly by photodetectors 29 placed along an annulus (FIG. 4).

A variation of polarization caused upon the light during the travel through the fibre has thus no bearing on the output signal inasmuch as it affects both the reference signal and the measurement signal. In addition, the expedients of FIGS. 3 and 4 and the suppression of the polarized beam splitter 21 prevent a polarization modulation of the signal which is recombined at the fibre input from giving rise to a modulation of the collected intensity.

Finally, the optical scheme suggested in FIG. 2, can be modified in the portion of the beam splitter 26, while still retaining the same operative principle. More particularly, changes may be introduced which permit that the scattering of light power may be decreased.

To the latter purpose, the beam splitter 26 can be replaced by an integrated beam splitter (also indicated by 26 in the two different patterns of FIGS. 5 and 6) which is embodied with a coupling technique between single-mode optical fibres. Such a device, while still working under the same operational principle, affords the advantage of making possible the splitting of the original beam and the subsequent recombination without losses of power in the beams returning from the mirror 27 and from the target 28. It is obvious that the mirror 27 can be integrated and that the optical fibre integrated beam splitter 26 can be replaced by any equivalent beam splitter constructed with discrete optical elements.

I claim:

1. An optical-fibre interferometer with differential substraction of the noise collected by the optical-fibre transmission line, characterized in that it comprises a laser-light emitter which sends a beam of polarized light to the input end of a single-mode optical fibre, at the output end whereof a first beam splitter is provided which directs the two resultant beams onto a reference mirror and onto a device which produces a reflection of the beam with modulation of the optical phase to be detected, respectively, the two reflected beams coming from the device and the reference mirror being fed back through said first splitter to said output end of the optical fibre to form a composite beam sent from said input end of the optical fibre to a detecting element.

2. Interferometer according to claim 1, characterized in that it comprises a second beam splitter inserted between said laser-light emitter and said input end of the optical fibre to give a free way to said polarized light beam and to send said composite beam to said detecting element.

3. Interferometer according to claim 2, characterized in that said light beam is linearly polarized prior to being passed through said second beam splitter and is subsequently circularly polarized through a quarter-wavelength lamina.

4. Interferometer according to claim 1, characterized in that said optical fibre is combined with optical assemblies both at the input and the output.

5. Interferometer according to claim 1, characterized in that said device for reflecting the beam with phase modulation consists of a vibratory mirror.

6. Interferometer according to claim 1, characterized in that said polarized light beam consists of two discrete beams having mutually orthogonal polarization and said first beam splitter consists of a polarizing beam splitter.

7. Interferometer according to claim 6, characterized in that it comprises a delay half-wavelength lamina inserted between said optical fibre input end and said detecting element.

8. Interferometer according to claim 1, characterized in that it comprises a diverging optical element placed in correspondence with said input end of said optical fibre.

9. Interferometer according to claim 8, characterized in that said composite beam is sent to said detecting element via a perforated mirror inserted between said optical fibre input end and said laser-light emitter.

10. Interferometer according to claim 8, characterized in that said detecting element consists of a plurality of photodetectors arranged along an annulus.

11. Interferometer according to claim 1, characterized in that said first beam splitter is composed of mutually coupled single-mode optical fibres.

12. Interferometer according to claim 1, characterized in that said first beam splitted is constructed with integrated optical technology.

13. Interferometer according to claim 1, characterized in that said first beam splitter is constructed with discrete optical elements.

* * * * *